United States Patent
Oyama (10) Patent No.: US 9,193,354 B2
(45) Date of Patent: Nov. 24, 2015

(54) DRIVING SUPPORT SYSTEM

(71) Applicant: FUJI JUKOGYO KABUSHIKI KAISHA, Tokyo (JP)

(72) Inventor: Hajime Oyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/578,104

(22) Filed: Dec. 19, 2014

(65) Prior Publication Data

US 2015/0183426 A1    Jul. 2, 2015

(30) Foreign Application Priority Data

Dec. 27, 2013    (JP) .................... 2013-271585

(51) Int. Cl.
  *G06F 7/00*    (2006.01)
  *B60W 30/00*    (2006.01)

(52) U.S. Cl.
  CPC .................... *B60W 30/00* (2013.01)

(58) Field of Classification Search
  None
  See application file for complete search history.

(56) References Cited

U.S. PATENT DOCUMENTS

| | | | |
|---|---|---|---|
| 6,548,915 B1* | 4/2003 | Geber et al. ............... | 307/10.2 |
| 2011/0044507 A1* | 2/2011 | Strauss et al. ............. | 382/103 |
| 2013/0184915 A1* | 7/2013 | Boskovitch et al. ........ | 701/22 |
| 2014/0152225 A1* | 6/2014 | Zhou et al. ................. | 318/500 |
| 2015/0019266 A1* | 1/2015 | Stempora .................. | 705/4 |

FOREIGN PATENT DOCUMENTS

| | | |
|---|---|---|
| JP | 3332501 B2 | 7/2002 |
| JP | 2012-058984 A | 3/2012 |

* cited by examiner

*Primary Examiner* — Adam Alharbi
(74) *Attorney, Agent, or Firm* — McDermott Will & Emery LLP (57) ABSTRACT

When driving support control starts, a control start condition is examined. It is examined whether or not all determination items set for the control start condition are OK, (whether the control start condition is established). If at least one of the determination items is NG, the determination condition is determined not to be established and the determination items determined to be NG are extracted. The determination item due to which a driver suspects that a fault has occurred is selected from the extracted determination items on the basis of a vehicle speed and a duration time in which the determination item is determined to be NG. The selected item is stored as an NG code.

4 Claims, 5 Drawing Sheets

DRIVING SUPPORT SYSTEM

CROSS-REFERENCE TO RELATED APPLICATIONS

The present application claims priority from Japanese Patent Application No. 2013-271585 filed on Dec. 27, 2013, the entire contents of which are hereby incorporated by reference.

BACKGROUND

1. Technical Field

The present invention relates to a driving support system which extracts and stores a determination item that causes a driver to suspect that a fault has occurred in a vehicle, from among predetermined determination items, in the case where a starting condition to be examined before starting driving support control is determined not to be established.

2. Related Art

Heretofore, a lane departure prevention (LDP) control system, a lane keeping steering assist (LKSA) control system, and the like are known as driving support control systems which perform steering (steering control, brake control, and the like) of a vehicle on the basis of information on the environment in front of the vehicle. For example, Japanese Patent No. 3332501 discloses a technique of the LDP control.

The lane departure prevention control system steers the vehicle so that the vehicle returns to a center part of a travelling lane when it is determined that the vehicle is likely to deviate from the travelling lane. The lane keeping steering assist control system sets a target travelling position in the travelling lane and steers the vehicle so that the vehicle travels forward the target travelling position. This steering control is activated by supplying a steering force to a steering mechanism by, for example, an actuator to turn the front wheels or by applying different braking forces to the right and left wheels so as to generate a yaw moment.

Even if the driver turns a control switch to an ON state to start support control, the system does not start the support control immediately. When a start condition is examined and found not to be established, the support control does not start, even if the control switch is turned to the ON state. There are some circumstances in which the support control does not start on account of bad weather conditions, road surface conditions, vehicle moving conditions, and the like.

If the support control does not start due to the bad weather conditions or the road surface conditions, the driver can easily recognize the conditions, and thus the readily understand the reason why the support control does not start (the start condition is not established). However, if the support control does not start due to a cause which is not recognized by the driver and if the cause persists, may suspect that any fault occurs.

In this case, the driver may bring the vehicle to an automobile dealer to examine the cause of the fault. However, even in the case where the start condition was not satisfied and thus the support control does not start, it is difficult to clarify the cause, if a history of events in which the start condition is not established why is detected. Although it is one way to store all of the past events in which the start condition is not established, work for finding the cause of the fault may become complicated.

SUMMARY OF THE INVENTION

The present invention has been designed in consideration of the circumstances described above, and an object thereof is to provide a driving support system that can readily identify the cause for which a driver turns a control switch to an ON state but driving support control does not start.

An aspect of the invention provides a driving support system including: a travelling environment detection unit which detects an environment in front of a vehicle; a lane recognition unit which recognizes a travelling lane of the vehicle on the basis of the travelling environment detected by the travelling environment detection unit; and a driving support control unit which performs driving support control of the vehicle on the basis of the travelling lane recognized by the lane recognition unit; in which the driving support control unit includes: a start condition determination module which determines a start condition of every predetermined determination item at the time of starting the driving support control; a determination item selecting module which selects down a determination item, in a case when a driver suspects that a fault has occurred in the vehicle, from among the determination items which are determined to be unallowable in the case where the start condition determination module determines that a start condition is not established; and a code storing module which stores the determination item selected by the determination item selecting module as an unallowable code.

DETAILED DESCRIPTION

Figure 1:
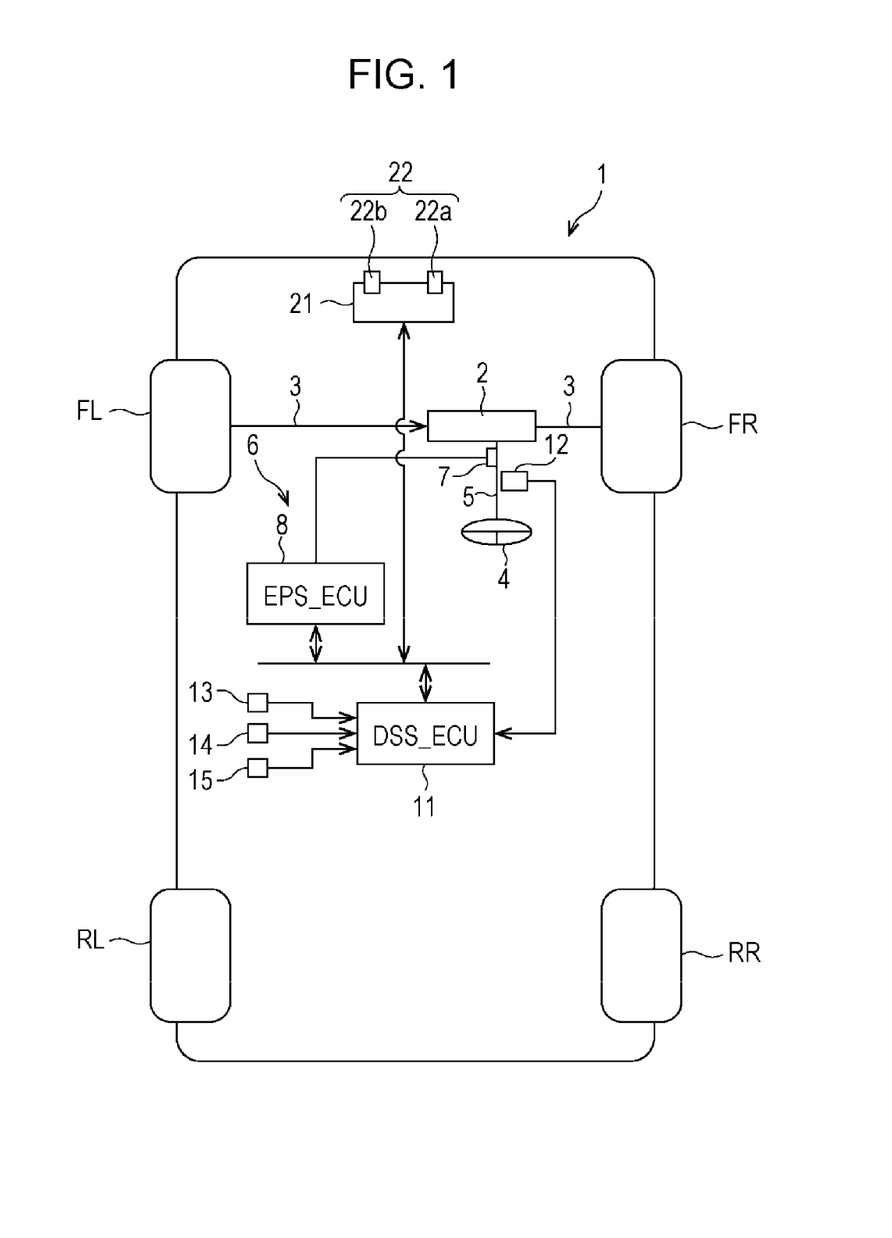
FIG. 1 is a schematic block diagram of a vehicle equipped with a driving support system according to an implementation of the invention.

Hereinafter, an implementation of the present invention will be described with reference to the figures. In FIG. 1, a vehicle 1 is provided with front right and left wheels FR and FL, and rear right and left wheels RR and RL. The front right and left wheels FR and FL are connected to a steering mechanism 2 such as a rack-pinion mechanism via tie rods 3. An end of a steering shaft 5 is connected to the steering mechanism 2, while the other end of the steering shaft 5 is connected to a steering wheel 4. When a driver operates the steering wheel 4, the front right and left wheels FR and FL are turned by the steering mechanism 2.

An electric power steering (EPS) motor 7 of an EPS device 6 is connected to the steering shaft 5 via a transmission mechanism (not shown). The EPS device 6 includes the EPS motor 7 and an EPS control unit (EPS_ECU) 8. The EPS_ECU 8 controls an assist torque which is applied to the steering shaft 5 by the EPS motor 7. The EPS_ECU 8 sets a assist torque which assists a steering torque to be applied to the steering wheel 4 by the driver according to information such as a steering wheel angle detected by a later-described steering wheel angle sensor 12, a vehicle speed detected by a later-described vehicle speed sensor 13. Applying the assist torque to the steering shaft 5 reduces driver's load of the steering wheel operation.

The EPS_ECU 8 is connected to a driving support system electric control unit (DSS_ECU) 11 which supports a driving operation of the driver via an in-vehicle network such as controller area network (CAN). In the driving support control, a command signal corresponding to the assist torque set in the DSS_ECU 11 is transmitted to the EPS_ECU 8. The EPS_ECU 8 generates a given assist torque in the EPS motor 7. Consequently, the vehicle 1 is controlled to follow a target path to be described later. In addition to the EPS_ECU 8 and the DSS_ECU 11, the in-vehicle network contains unillustrated control units which control travelling conditions of the vehicle 1, such as an engine control unit, a transmission control unit, and a vehicle dynamic control (DDC) unit including a brake control unit. The control units (are interconnected to communicate with one another. These control units are mainly composed of microcomputers.

The DSS_ECU 11 receives signals from sensors which detect the behavior of the vehicle 1. These sensors include: the steering wheel angle sensor 12 which is attached to the steering shaft 5 and detects the angle of the steering wheel 4; the vehicle speed sensor 13 which detects a vehicle speed; and the steering torque sensor 14 which detects the steering torque applied to the steering wheel 4 by the driver. Furthermore, the DSS_ECU 11 receives signals from a control switch 15, which is used to select an ON/OFF state of the driving support control, and selects a driving support mode in the case of the ON state, that is, either one of the lane departure prevention (LDP) mode and the lane keeping steering assist (LKSA) mode.

Furthermore, the DSS_ECU 11 receives various kinds of parameters required for determining a later-described control start condition from the respective control units via the in-vehicle network. The parameters include a yaw rate, which affects the vehicle 1, and the speeds of the four wheels. The steering wheel angle detected by the steering wheel angle sensor 12 and the vehicle speed detected by the vehicle speed sensor 13 are also read by a lane recognition unit 24 to be described later.

A diagnostic connector 16 (illustrated in FIG. 2) coupled to a personal computer (not shown), which performs fault diagnosis, is connected to an output side of the DSS_ECU 11. Connecting the personal computer via the diagnostic connector 16 to the DSS_ECU 11 makes it possible to read a later-described NG (unallowable) code stored in the DSS_ECU 11.

Figure 2:
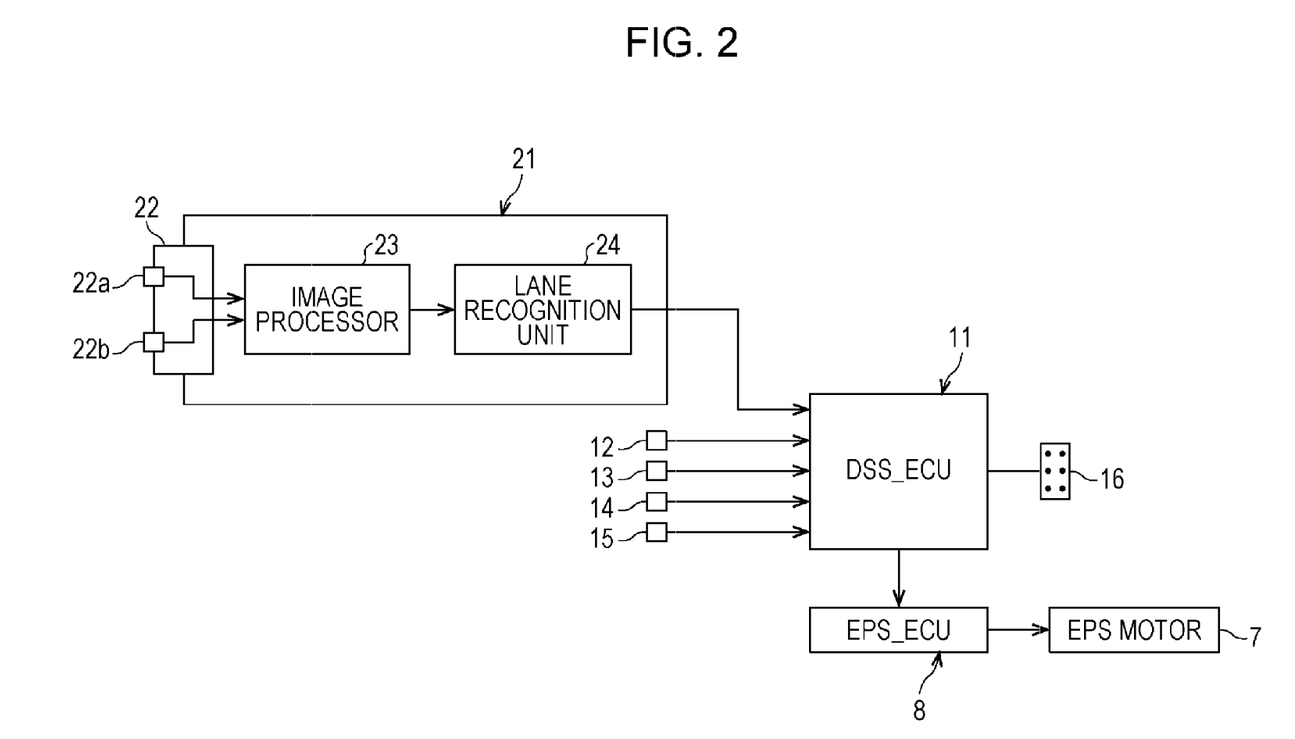
FIG. 2 is a schematic block diagram of the driving support system according.

On the other hand, as illustrated in FIG. 2, a camera unit 21 includes an onboard camera assembly 22, an image processor 23 and a lane recognition unit 24. The onboard camera assembly 22 is a stereo monochrome camera assembly or a stereo color camera assembly, and includes a main camera 22a and a subcamera 22b. The onboard camera assembly 22 serves as the travelling environment detection unit of the present invention. The lane recognition unit 24 generates image information necessary for the driving support control and includes a microcomputer. The lane recognition unit 24 serves as the lane recognition unit of the present invention.

Both cameras 22a and 22b are disposed, for example, above a rear-view mirror in the front of the vehicle interior and near a windshield, are spaced to the left and right of the vehicle center line, and are arranged horizontally. Each of the cameras 22a and 22b is provided with an image capturing device such as a CCD or a CMOS. The image capturing devices of the cameras 22a and 22b capture a three-dimensional image of the travelling environment in front of the vehicle 1, including the travelling lane of the vehicle 1. In the present implementation, the travelling lane of the vehicle 1 and three-dimensional objects including a preceding vehicle, obstacles, or the like can be recognized on the basis of the image data recorded by the onboard camera assembly 22. Accordingly, it may be possible to utilize a millimeter wave radar, an infrared laser radar, or the like in place of the onboard camera assembly 22, if the radar can recognize the above factors. It may be further possible to utilize a combination of the camera and the radar.

The image processor 23 converts a pair of analog images captured by the respective cameras 22a and 22b into digital images having a given brightness gradation and generates reference image data from output signals of the main camera 22a. Output signals from the subcamera 22b are used to generate comparative image data. On the basis of a parallax between the reference image data and the comparative image data, three-dimensional information of the same object in both images, that is, a distance between the vehicle 1 and the object, is calculated. The onboard camera assembly 22 may be a monocular camera. In this case, it is possible to obtain three-dimensional information by utilizing a well-known motion stereo method or the like.

Figure 5A:
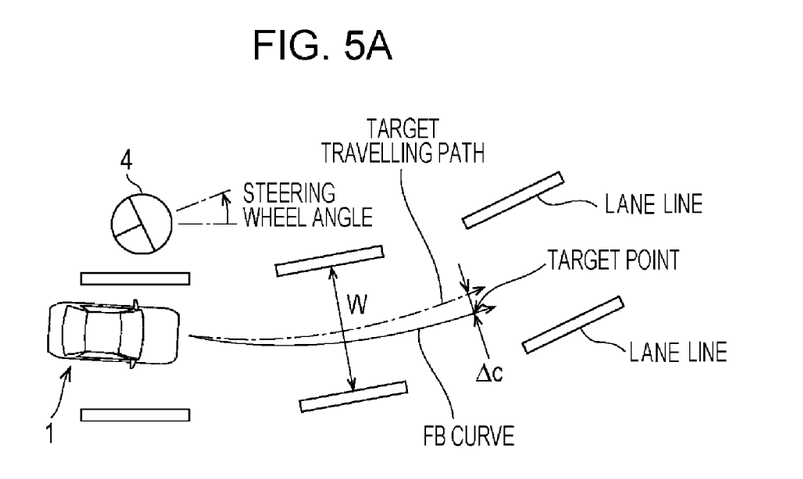
FIG. 5A is a plan view which illustrates a vehicle travelling in a lane keeping steering assist (LKSA) mode.
Figure 5B:
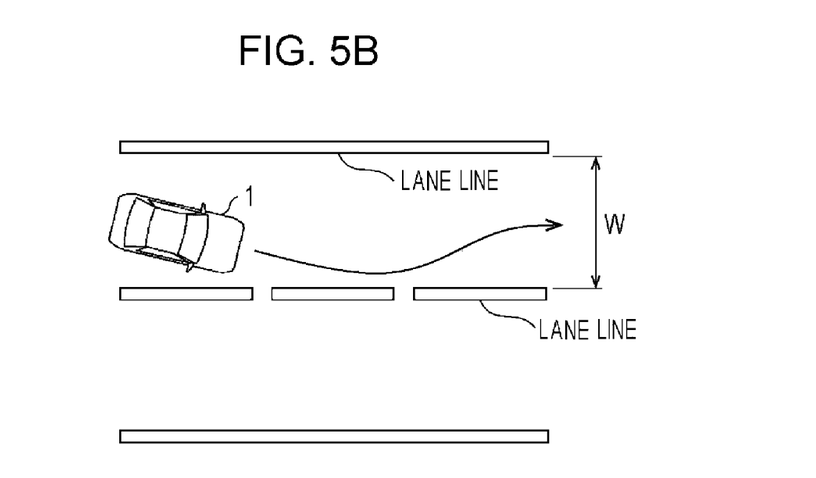
FIG. 5B is a plan view which illustrates a vehicle travelling in a lane departure prevention (LDP) mode.

The lane recognition unit 24 recognizes right and left lane lines on the basis of image data from the image processor 23 and obtains the distance (a lane width) W between the inner edges of the right and left lane lines (see FIGS. 5A and 5B). For details of a method for obtaining the vehicle width distance, see for example, Japanese Unexamined Patent Application Publication No. 2012-58984.

The DSS_ECU 11 performs driving support control on the basis of the vehicle width W on the vehicle travelling path obtained by the lane recognition unit 24 and the driving support mode (LDP mode/LKSA mode) set by the control switch 15.

Figure 3:
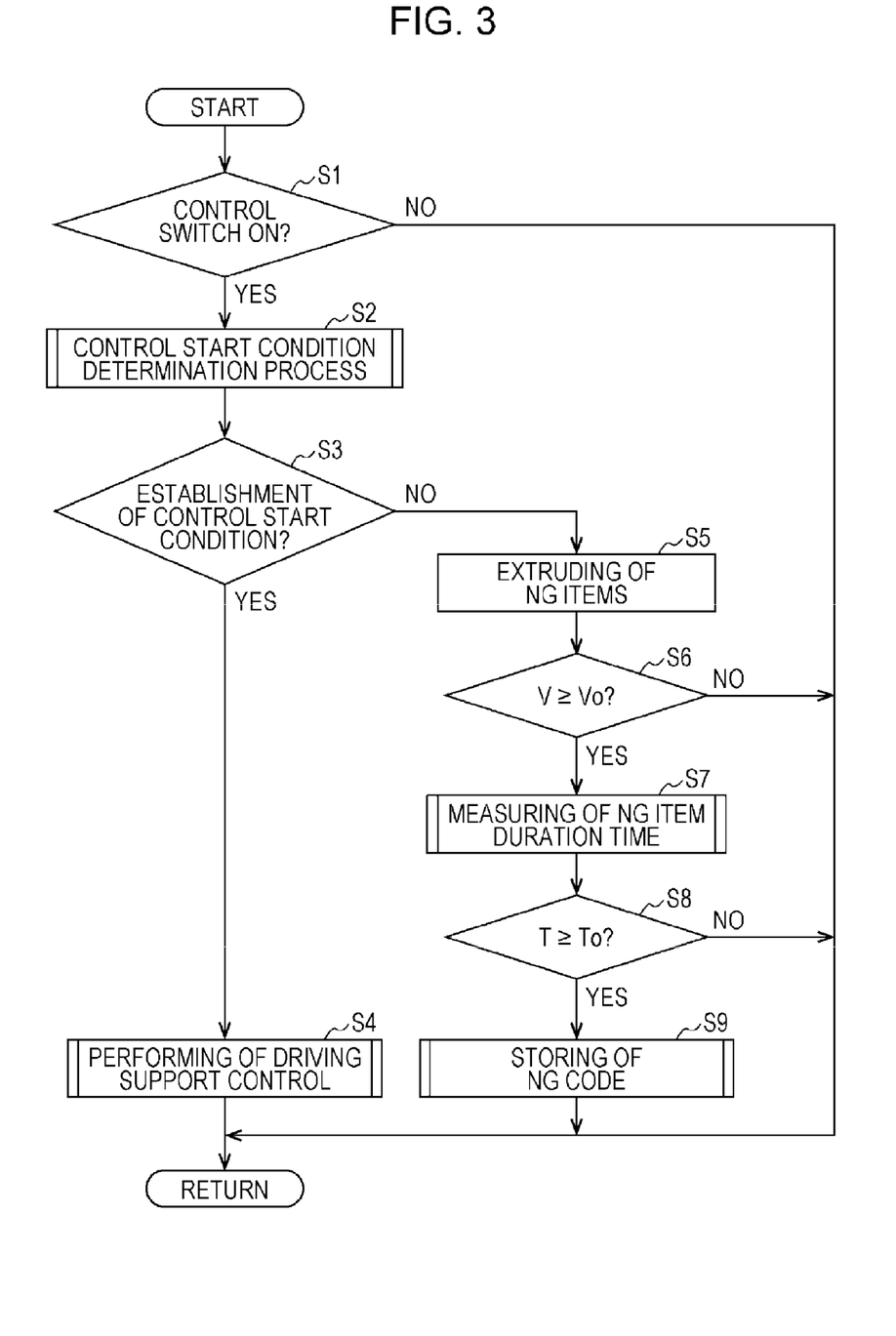
FIG. 3 is a flow chart which illustrates a driving support control routine.

The driving support control which is executed by the DSS_ECU 11 with a driving support routine illustrated in FIG. 3. This routine starts in synchronization with image information of every one frame transmitted from the lane recognition unit 24. Firstly, in step S1, it is examined whether the control switch 15 is turned to the ON state. If the control switch 15 is turned to the ON state, the routine advances to step S2. If the control switch 15 is turned to the OFF state, the routine is exited.

In step S2, the DSS_ECU 11 checks determination items, which determine a predetermined start condition, before beginning the driving support control. In step S3, the DSS_ECU 11 checks whether all determination items are satisfied. If they are satisfied, the DSS_ECU 11 determines that the driving start condition is established. The routine advances to step S4. If at least one of the determination items is not satisfied, the driving start condition is determined not to be established. The routine branches to step S5. Processing in steps S2 and S3 correspond to the start condition determination module of the present invention.

Examples of the determination items set for the control start condition will be described below.

[The Value of Driving Current of the EPS Motor 7 Must be within an Upper Limit.]

In the case where the value of driving current of the EPS motor 7 exceeds an upper limit, it is expected that excessive current flows in the EPS motor 7 on account of static steering or the like and thus the EPS motor 7 is overheated. Then, it is determined that it is difficult to normally control the assist torque. Consequently, if the where the value of driving current of the EPS motor 7 exceeds the upper limit, the determination item is determined to be NG (unallowable).

[An Output Signal from the Steering Torque Sensor 14 Must be Detected.]

This is a determination item to detect a hands-off driving. If an extremely feeble torque is not detected within a given period of time, the determination item is determined to be NG (unallowable).

[A Steering Wheel Angle Detected by the Steering Wheel Angle Sensor 12 is not Reversed (Switched) Over a Given Angle and a Given Number of Times within a Given Period of Time.]

This is a determination item to detect the repetition of sharp curves. If the steering wheel angle is reversed (switched) over the given angle and the given number of times within the given period of time, the determination item is determined to NG (unallowable).

[A VDC Signal is not Detected.]

This is a determination item for avoiding interference with vehicle dynamic control (VDC). If a VDC signal is detected, the determination item is determined to be NG (unallowable).

[Air Pressures in Each Tire of Four Wheels Must Remain within a Suitable Range.]

If the air pressure in one tire is extremely low, it is difficult to maintain normal steering control. The air pressure in each tire itself may be detected to determine whether the air pressure in each wheel remains within the normal range. Alternatively, for example, the air pressure may be determined on the basis of the yaw rate and the speed of each of the four wheels. Specifically, in the case where the speed of one of the four wheels is extremely lower than those of the other wheels during straight travelling when the yaw rate remains within a given range, the air pressure in the one tire is determined to be low.

[An Approximate Curve Must be Set to Estimate an Inner Edge of a Lane Line.]

If the approximate curve is not set, the lane recognition unit 24 is unlikely to recognize the lane line, whereby the determination item is determined to be NG (unallowable). In fog, rain, snow, and the like, it is difficult for a driver himself/herself to recognize the lane line. Besides these weather conditions, the lane recognition unit 24 may not able to recognize the lane line if the lane line itself is obscured due to aged deterioration, shadow, or a thin layer of snow. In these situations, the lane recognition unit 24 may not able to recognize the inner edges of the lane lines and thus the approximate curve may not be created, even though the driver can recognize the lane line.

Figure 4:
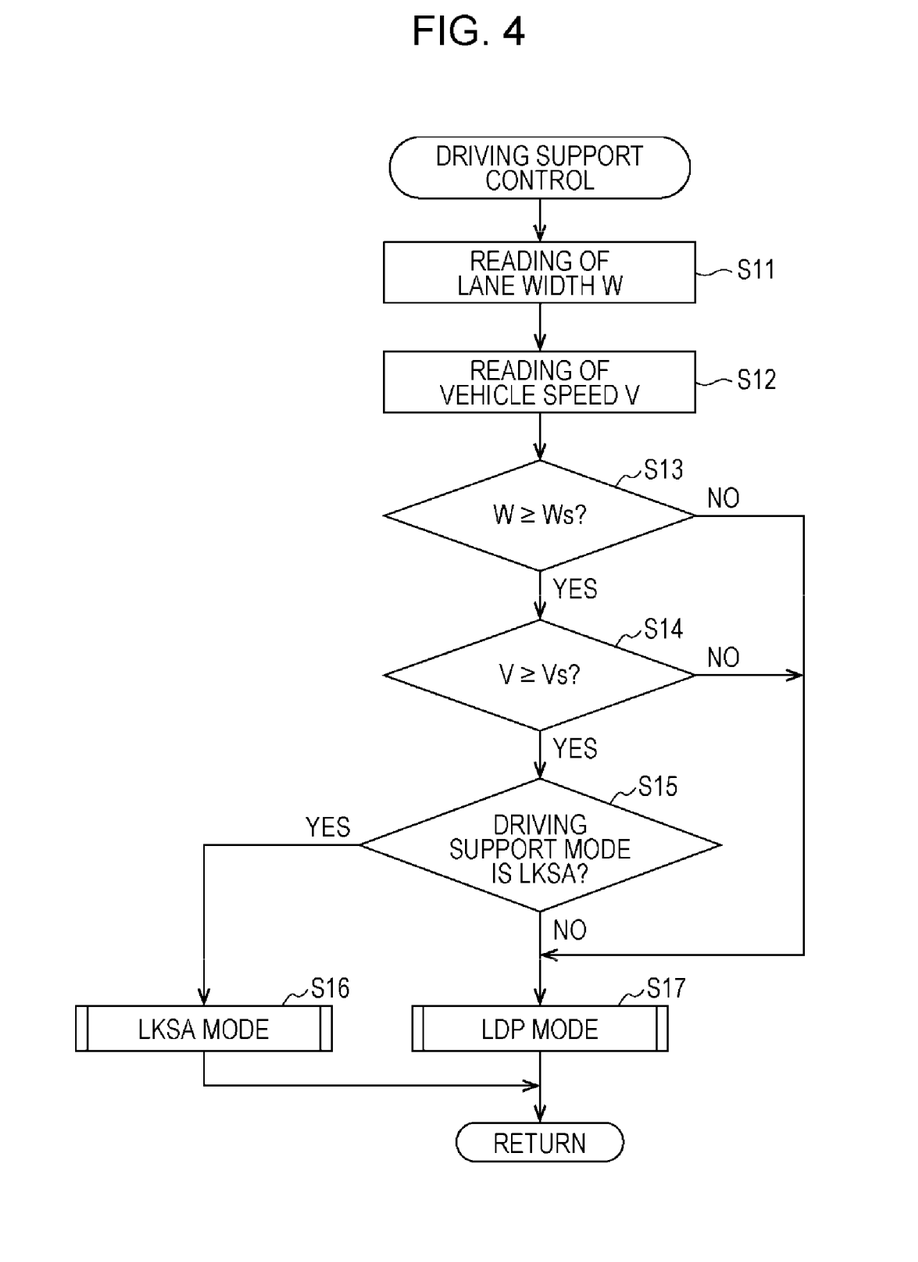
FIG. 4 is a flow chart which illustrates a driving support control subroutine.

As described above, if all of the determination items are determined to be OK (allowable), it is determined that the control start condition is established, and the routine advances to step S4, where a driving support subroutine illustrated in FIG. 4 is executed, and the main routine is exited. The driving support subroutine will be described later.

On the other hand, if at least one of the determination items is determined to be NG (unallowable), the control start condition is determined to be not established. Then the routine jumps to step S5. In step S5, NG code storing processing is performed in steps S5 to S9. This NG code storing processing is executed to select and stores the determination items due to which the driver suspects that driving support control has not started and that a fault has occurred, despite the fact that the driver turns the control switch 15 to the ON state.

Firstly, in step S5 the determination item which is determined to be NG in step S2. In step S5 the determination items on which the driver a suspicion on are selected, from the determination items extracted in steps S6 to S8. In this case, the determination items to which the driver cause to suspect failure has been determined in advance based on the research and the like.

In step S6 a vehicle speed V is compared with a high-speed determination vehicle speed Vo. The high-speed determination vehicle speed Vo is a threshold which is used to determine whether the vehicle 1 travels at a high speed on a highway. The threshold value is set to be, for example, 85 to 95 Km/h. The driver requires the driving support control often when the vehicle travels at a high speed on the highway. At this time, the determination items which are determined to NG are selected. If the speed V is equal to or larger than the speed Vo (V≥Vo), the routine advances to step S7. If the speed V is smaller than the speed Vo (V<Vo), the routine is exited. Accordingly, in the case of V<Vo, the determination item is not stored.

On the other hand, when the routine advances to step S7, a duration time T in which the determination item is determined to be NG is measured. In step S8, it is determined whether the duration time T exceeds a set time To. The set time To is a time period limit after which the driver comes to suspect a fault in the vehicle. The set time To is set to be, for example, 20 to 30 seconds. Suppose that the set time To is set to be, for example, 30 seconds, and that the number of frames per second is 30, only the determination item, which is continuously detected over a moving distance corresponding to 900 frames, is selected. Processing in steps S6 to S8 correspond to the determination item selecting module of the present invention.

If the duration time T is equal to or larger than the set time To (T≥To), it is determined that the determination item exceeds the time period limit for the driver. The routine then advances to step S9, where the determination item (the NG code), which is determined to be NG, is stored and the routine is exited. In this case, the stored date and time as well as GPS position coordinates, which indicate the position (the longitude and latitude) of the vehicle 1 at the time of storing the NG code may be stored together with the NG code.

The NG code can be read by connecting a fault diagnostic personal computer (not shown), which is prepared by the dealer, to the DSS_ECU 11 via a diagnostic connector 16. In the case where a worker at the dealer is asked by the driver if any fault has occurred in the vehicle 1 brought to the dealer, the fault diagnostic personal computer is connected to the DSS_ECU 11 to read the NG code, whereby the worker identifies the reason why the driving support control did not start. As a result, the worker can inform the driver about the circumstances at that when the driving support control did not start, and can clear up the suspicion of the driver. Note that processing in step S9 corresponds to the code storing module of the present invention.

Next, driving support control processing in step S4 will be described briefly. This driving support control processing is executed in accordance with the driving support control subroutine illustrated in FIG. 4. Firstly, in step S11, the DSS_ECU 11 reads a lane width W of the vehicle travelling path obtained by the lane recognition unit 24. Then, in step S12, the DSS_ECU 11 reads the vehicle speed V.

In subsequent steps S13 and S14 it is determined whether the vehicle 1 is travelling on a highway. Specifically, in step S13, it is determined whether the lane width W is equal to or larger than a set lane width Ws (W Ws). The set lane width Ws is a threshold which determines whether a travelling lane has a lane width corresponding to a highway. The set lane width Ws is set to be, for example, 2.8 to 3.0 meters. in step S14, the vehicle speed V is compared with a highway travelling determination speed Vs. The highway travelling determination speed Vs is a threshold which is used to determine whether the vehicle 1 is travelling on a highway. The highway travelling determination speed Vs is set to be 80 to 85 Km/h.

If it is determined in step S13 that the lane width W is equal to or larger than the set lane width Ws (W≥Ws), and if it is determined in step S14 that the vehicle speed V is equal to or larger than the highway travelling determination speed Vs (V≥Vs), the vehicle 1 is determined to be travelling on the highway, and the subroutine advances to step S15. If it is determined in step S13 that the lane width W is smaller than the set lane width Ws (W<Ws), or if it is determined in step S14 that the vehicle speed V is smaller than the highway travelling determination speed Vs (V<Vs), the vehicle 1 is determined not to be travelling on the highway, and the subroutine jumps to step S17.

When it is determined in step S14 determines that the vehicle 1 is travelling on the highway, and the subroutine advances to step S15, the DSS_ECU 11 reads a driving support mode, which is selected by the driver on the basis of the signal from the control switch 15. If the driver selects the LKSA mode, the subroutine advances to step S16, where the LKSA mode is executed, and then the subroutine is exited. On the other hand, if the driver selects the LDP mode, the subroutine advances to step S17.

When the subroutine advances from step S13, S14, or S15 to step S17, the LDP mode is executed and the subroutine is exited. Accordingly, in the present implementation, the LDP mode is executed as a default travelling mode. If the driver operates the control switch 15 to select the LKSA mode as the driving support mode, the LKSA mode is executed during high-speed travelling.

When the LKSA mode is executed, as illustrated in FIG. 5A, a target travelling path (for example, a center between the right and left lanes), along which the vehicle 1 should travel, is set on the basis of the inner edges of the right and left lanes, and an FF target steering wheel angle is set on the basis of the recognition curvature of the target travelling path and the vehicle speed V. An FB curvature is set on the basis of the steering wheel angle (a real steering wheel angle) detected by the steering wheel angle sensor 12 and the vehicle speed V. Then, using the FB curvature, a position (a target point) in the travelling direction of the vehicle 1 after a given period of time lapses is determined. An FB target steering wheel angle is set so that a displacement width Ac between the target point and the target travelling path becomes zero (0). A final instruction steering wheel angle is set by adding the FR target steering wheel angle to the FF target steering wheel angle. An EPS additional torque corresponding to the instruction steering wheel angle is supplied to the EPS_ECU 8 to drive the EPS motor 7. As a result, steering control is executed so that the vehicle 1 travels along the target travelling path.

On the other hand, when the LDP mode is executed, as illustrated in FIG. 5B, if the DSS_ECU 11 determines that the vehicle 1 is likely to deviate from an approximate curve which is estimated from the inner edges of the lane lines defining the travelling lane, the DSS_ECU 11 warns the driver of the fact and sends an additional torque instruction value to the EPS_ECU 8 to return the vehicle 1 to the center of the lane. Accordingly, the EPS motor 7 is driven to prevent deviation from the lane.

As described above, the implementation of the invention does not store all the determination codes (the NG codes) which are determined to NG among the determination items of the control start condition which are examined at the start of the driving support control, are not stored. The determination items, due to which the driver is suspects that a fault occurs in the vehicle, are selected, and the NG codes of such determination items are stored. Accordingly, the worker at the dealer can readily find, on the basis of the NG code, the cause for which the driving support control does not start.

In the above implementation, on the basis of the vehicle speed V and the duration time T, the NG code to be stored is continuously selected to the determination item which becomes the NG code when the vehicle 1 travels at a high speed on the highway, it is possible to determine the cause clearly and briefly.

It should be noted that the invention is not limited to the above implementation. For example, the stored NG codes may be selected on the basis of another parameter other than the vehicle speed and the duration time.

The invention claimed is:

1. A driving support system for a vehicle, comprising:
a travelling environment detection unit that detects an environment in front of the vehicle equipped with the driving support system;
a lane recognition unit that recognizes a travelling lane of the vehicle on the basis of the travelling environment detected by the travelling environment detection unit;
detectors for detecting conditions of vehicle operation items; and
a driving support control unit that performs driving support control for the vehicle on the basis of the travelling lane recognized by the lane recognition unit, the driving support control unit being configured to, associated with the detectors:
determine, responsive to receipt of a control start instruction, whether the detected conditions meet first requirements provided for the respective vehicle operation items, at the time of starting the driving support control;
when the detected conditions meet the respective first requirements, start performing the driving support control;
when at least one detected condition does not meet its requirement, determine whether one vehicle operation item corresponding to the one detected condition needs to be stored for a later diagnostic, by determining whether the one detected condition meets a second requirement; and
when the second requirement is met, store a code corresponding to the one vehicle operation item, the code being readable by an external diagnostic apparatus.

2. The driving support system according to claim 1, wherein the driving support control unit is further configured to determine whether the one detected condition meets the second requirement, on condition that the conditions of the vehicle operation items are detected while the vehicle travels on a highway.

3. The driving support system according to claim 1, wherein
the second requirement is a reference time period, and
the driving support control unit is further configured to determine whether a time period during which the one vehicle operation item continues not to meet its first requirement is equal to or longer than the reference time period.

4. The driving support system according to claim 2, wherein
the second requirement is a reference time period, and
the driving support control unit is further configured to determine whether a time period during which the one vehicle operation item continues not to meet its first requirement is equal to or longer than the reference time period.

* * * * *